United States Patent
Singhal et al.

(10) Patent No.: US 7,543,100 B2
(45) Date of Patent: *Jun. 2, 2009

(54) NODE CONTROLLER FOR A DATA STORAGE SYSTEM

(75) Inventors: Ashok Singhal, Redwood City, CA (US); Jeffrey A. Price, Pleasanton, CA (US); David J. Broniarczyk, Mountain View, CA (US); George R. Cameron, Capitola, CA (US)

(73) Assignee: 3PAR, Inc., Fremont, CA (US)

( * ) Notice: Subject to any disclaimer, the term of this patent is extended or adjusted under 35 U.S.C. 154(b) by 309 days.

This patent is subject to a terminal disclaimer.

(21) Appl. No.: 09/883,681

(22) Filed: Jun. 18, 2001

(65) Prior Publication Data

US 2003/0188079 A1    Oct. 2, 2003

(51) Int. Cl.
*G06F 13/14* (2006.01)
(52) U.S. Cl. .................. 710/305; 710/100; 710/300; 711/112; 711/113; 711/114; 709/211
(58) Field of Classification Search .............. 709/211; 710/310–315, 100, 300, 305; 711/112–114
See application file for complete search history.

(56) References Cited

U.S. PATENT DOCUMENTS

| | | | |
|---|---|---|---|
| 4,920,484 A | 4/1990 | Ranade | |
| 5,388,222 A | 2/1995 | Chisvin et al. | |
| 5,613,071 A | 3/1997 | Rankin et al. | |
| 5,642,478 A * | 6/1997 | Chen et al. | 714/45 |
| 5,768,623 A * | 6/1998 | Judd et al. | 710/37 |
| 5,842,038 A | 11/1998 | Williams et al. | |
| 5,959,860 A * | 9/1999 | Styczinski | 700/12 |
| 6,026,464 A * | 2/2000 | Cohen | 711/5 |
| 6,044,441 A * | 3/2000 | Malinowski | 711/144 |
| 6,067,603 A * | 5/2000 | Carpenter et al. | 711/141 |
| 6,122,659 A * | 9/2000 | Olnowich | 709/213 |
| 6,128,762 A * | 10/2000 | Jadav et al. | 714/766 |
| 6,151,641 A * | 11/2000 | Herbert | 710/22 |
| 6,151,659 A * | 11/2000 | Solomon et al. | 711/114 |
| 6,167,492 A | 12/2000 | Keller et al. | |
| 6,173,374 B1 * | 1/2001 | Heil et al. | 711/148 |
| 6,209,067 B1 | 3/2001 | Collins et al. | |
| 6,301,711 B1 | 10/2001 | Nusbickel | |
| 6,601,138 B2 * | 7/2003 | Otterness et al. | 711/114 |

(Continued)

FOREIGN PATENT DOCUMENTS

JP    07-203337    4/1995

(Continued)

OTHER PUBLICATIONS

European Search Report, Jun. 23, 2004, 1 page.

(Continued)

*Primary Examiner*—Glenn A Auve
*Assistant Examiner*—Nimesh G Patel
(74) *Attorney, Agent, or Firm*—Patent Law Group LLP; David C. Hsia (57) ABSTRACT

A node controller for a data storage system having at least one node provides access to a data storage facility. The node controller is distinct from a computer-memory complex of the node. The node controller provides overall control for transferring data through the node.

36 Claims, 7 Drawing Sheets

U.S. PATENT DOCUMENTS

| | | | |
|---|---|---|---|
| 6,604,155 B1* | 8/2003 | Chong, Jr. .................... | 710/56 |
| 6,792,505 B2* | 9/2004 | Otterness et al. ............ | 711/114 |
| 7,082,390 B2* | 7/2006 | Bergsten ..................... | 703/21 |
| 2002/0087765 A1* | 7/2002 | Kumar et al. ............... | 710/107 |
| 2002/0161902 A1* | 10/2002 | McMahan et al. .......... | 709/229 |

FOREIGN PATENT DOCUMENTS

| | | |
|---|---|---|
| JP | 09-046842 | 6/1997 |
| JP | 10-078854 | 3/1998 |

OTHER PUBLICATIONS

TechEncyclopedia—Definition of Northbridge, downloaded Oct. 4, 2004 from www.techweb.com/encyclopedia/defineterm.jhtml?term=northridge, 1 page.

Japanese Office Action including translation, dated Jun. 13, 2006, Dispatch No. 249716 for Application No. 2002-517648, 9 pages.

European Office Action dated Feb. 20, 2006 for Application No. 02 254 085.0, 3 pages.

European Office Action dated Feb. 2, 2007, 51 pages.

* cited by examiner

NODE CONTROLLER FOR A DATA STORAGE SYSTEM

TECHNICAL FIELD OF THE INVENTION

The present invention relates generally to the field of data storage and, more particularly, to a node controller for a data storage system.

BACKGROUND OF THE INVENTION

In the context of computer systems, enterprise storage architectures provide mass electronic storage of large amounts of data and information. Many enterprise architectures incorporate disk storage systems to provide relatively inexpensive, non-volatile storage. Disk storage systems, however, may suffer from numerous problems. These problems include the following. Disk systems are prone to failure due to their mechanical nature and the inherent wear-and-tear associated with operation. Accesses (i.e., reads and writes) into disk systems are relatively slow, again due to their mechanical nature. Furthermore, disk storage systems have relatively low bandwidth for data transfer because the effective bandwidth is limited by "platter speed" (i.e., the rate at which data bits move under a disk head).

Various techniques have previously been developed to reduce the problems associated with disk storage systems. One such technique, referred to as "RAID" (Redundant Array of Inexpensive Disks), employs multiple disk drives. With RAID, one or more of the disk drives can store redundant data (e.g., parity information or a duplicate copy of the data itself) so that if another disk drive fails, the redundant data can be used to reconstruct the data.

The RAID technique, however, taxes the resources of a data storage system and the computer system for controlling the same. For example, RAID requires high-speed data cache, high bandwidth communication between data cache and other elements for the replication of data, mirroring of data for protected write caching, and high system bandwidth to host devices and disk drives.

Furthermore, with previously developed storage systems in general, a redundant pair of buses is used to connect all of the individual functional units, such as, host interfaces, disk interfaces, data cache, and communication channels. This approach not only limits the scalability of the systems, but also causes the shared interconnect to become a bottleneck to performance.

SUMMARY OF THE INVENTION

The disadvantages and problems associated with previously developed storage systems and techniques have been substantially reduced or eliminated using the present invention.

According to an embodiment of the present invention, a node controller for a data storage system having at least one node provides access to a data storage facility. The node controller is distinct from a computer-memory complex of the node. The node controller provides overall control for transferring data through the node.

According to another embodiment of the present invention, a node controller provides overall control for transferring data through a node of a data storage system. The node controller is distinct from a computer-memory complex of the node. The node controller includes a logic engine operable to perform a logic operation on data from at least one data source in the data storage system. A command queue is coupled to the logic engine. The command queue is operable to store a logic control block which can be processed by the logic engine.

A technical advantage of the present invention includes providing a node controller which can be integrated at a node of a data storage system and architecture. The node controller is separate from the computer-memory complex. The node controller, using cluster memory at the node, controls or coordinates transfers of data through the node. Accordingly, the computer-memory complex at the node is not burdened with such task. Thus, by reducing the workload and responsibilities of the computer-memory complex, the node controller facilitates and optimizes the overall operation of the data storage system and architecture.

The node controller can be implemented as an application specific integrated circuit (ASIC) on a system board for the node. The node controller may support a number of interconnect links that are connected via a backplane connector to other system boards. The node controller may control accesses (i.e., reads or writes) into one or more banks of cluster memory located at the node.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

The preferred embodiments for the present invention and their advantages are best understood by referring to FIGS. 1-7 the drawings. Like numerals are used for like and corresponding parts of the various drawings.

Environment for a Node Controller

Figure 1:
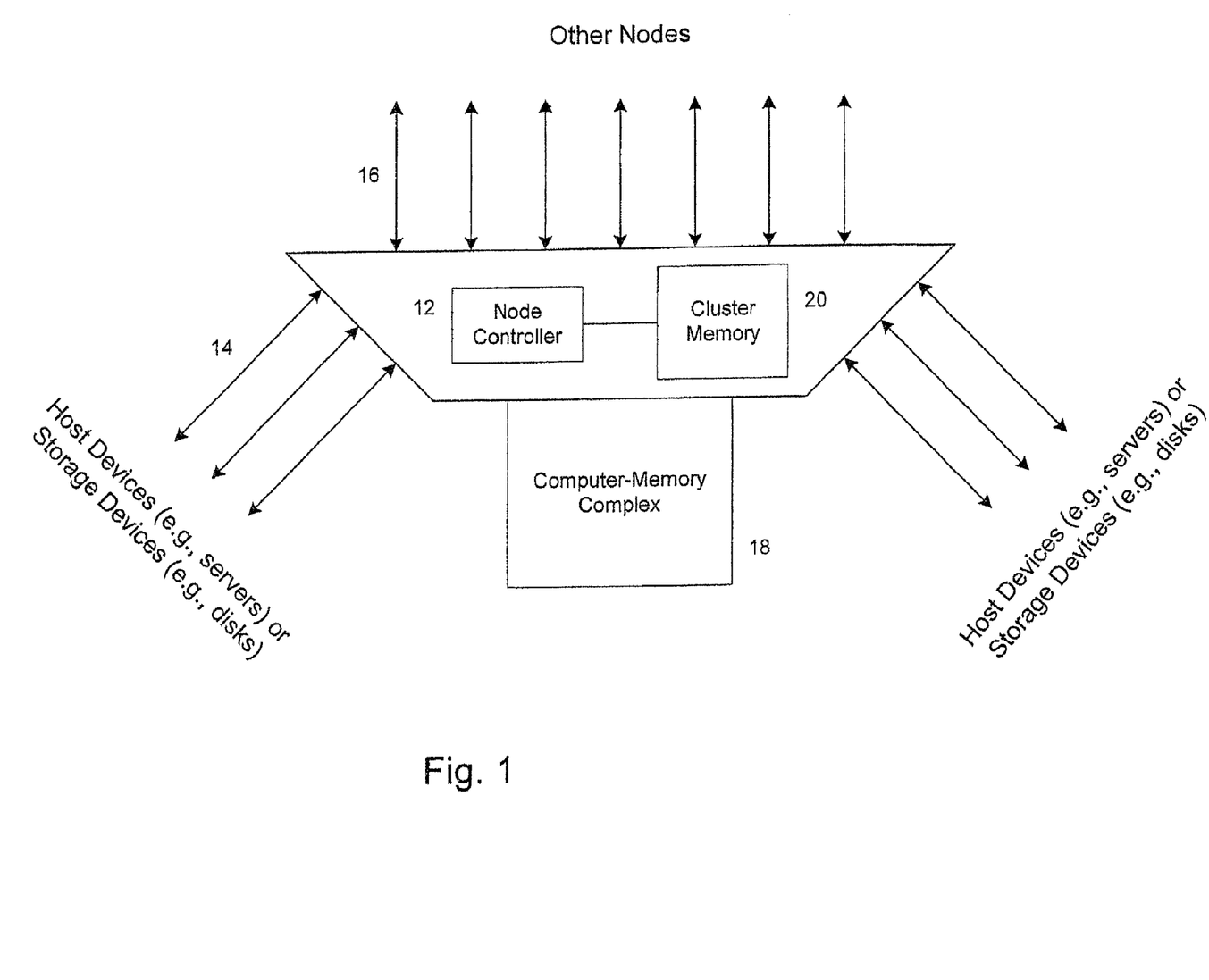
FIG. 1 illustrates an exemplifying environment in which a node controller, according to an embodiment of the present invention, may operate.

FIG. 1 is a block diagram of a node 10 within which a node controller 12, according to an embodiment of the present invention, may operate. Node 10 generally functions as a point of interface/access between one or more host devices and storage devices. These host devices can include various processing devices, such as, for example, a server cluster, a personal computer, a mainframe, and a server tower. Host devices may also include various peripheral devices, such as, for example, a printer, a modem, and a router. Storage devices can be implemented with any suitable mass storage resource, such as tape or disk storage. A data storage system within which node 10 can be incorporated is described in U.S. patent application Ser. No. 09/633,088 filed Aug. 4, 2000, entitled "Data Storage System," which is assigned to the present Assignee and incorporated by reference herein.

For interface/access, node 10 may include one or more peripheral component interconnect (PCI) slots, each of which supports one or more respective connections 14. As used herein, the terms "connected," "coupled," or any variant thereof, mean any connection or coupling, either direct or indirect, between two or more elements; such connection or coupling can be physical or logical. For clarity, only one connection 14 is labeled in FIG. 1. Each connection 14 can connect a host device or a storage device. Connections 14 can be small computer system interface (SCSI), fibre channel (FC), fibre channel arbitrated loop (FCAL), Ethernet, Infiniband, or any other suitable connection.

Node 10 may also interact with other nodes to implement a scalable architecture particularly well suited for communication-intensive, highly available data storage, processing, or routing. Such a data storage system is described in detail in U.S. application Ser. No. 09/633,088, which is incorporated by reference herein in its entirety. Node 10 supports a number of communication paths 16, which enable communication with other nodes. A separate communication path 16 may be provided for each node with which node 10 communicates. Each communication path 16 may be implemented as a high-speed, bi-directional link having high bandwidth to provide rapid transfer of data and information between node 10 and another node. In one embodiment, the links can be two-bytes wide and operate at 266 MHz in each direction, for a total bandwidth of 1,064 MB/s per link. Communication paths 16 provide a low latency communication channel between nodes without the protocol overhead of transmission control protocol/internet protocol (TCP/IP) or Fibre Channel protocol. Control of data/information transfers over communication paths 16 is shared among the nodes. In one embodiment, transfers of data/information over communication paths 16 are covered by an error-correcting code (ECC) that can cover a single bit error in any 64-bit word and can detect any line error on the communication paths 16.

As depicted, node 10 may include a computer-memory complex 18. Computer-memory complex 18 can be a computer system which includes one or more central processing units (CPUs) and associated memory, each CPU-memory combination running an independent copy of an operating system. Computer-memory complex 18 functions to support, control, or otherwise manage one or more suitable buses through which data and information can be transferred via connections 14. In one embodiment, each such bus can be a peripheral component interconnect (PCI) bus. Computer-memory complex 18 may also support other functions, such as, for example, a hypertext transport protocol (HTTP) service, a network file system (NFS) service, and a common Internet file system (CIFS) service.

In one embodiment, node 10 can be implemented as a system board on which are provided suitable central processing unit (CPU) devices, memory devices, and application specific integrated circuit (ASIC) devices for providing the functionality described herein. This system board can be connected on a backplane connector which supports communication paths 16. Such an embodiment is shown and described below with reference to FIG. 2.

Node controller 12 resides on node 10 along with a cluster memory 20. Node controller 12 and cluster memory 20 are distinct and separate from computer-memory complex 18. In one embodiment, node controller 12 can be implemented as an application specific integrated circuit (ASIC) device. Node controller 12 may cooperate with computer-memory complex 18 but, to some degree, operates independently of the same. That is, computer-memory complex 18 may program node controller 12. Node controller 12, as programmed, can then operate independently on data, thereby providing overall control for the transfer of data through node 10. Accordingly, computer-memory complex 18 is not burdened with the task of performing actual operations on the data. Cluster memory 20 is coupled to node controller 12 and, as described herein, generally functions to cache data and information being transferred through node 10. Cluster memory 20 can be implemented as any suitable cache memory, for example, synchronous dynamic random access memory (SDRAM).

With node controller 12 (cooperating with cluster memory 20), data/information being transferred through node 10 (including bulk transfers) does not have to be temporarily stored in computer-memory complex 18. This ability to let bulk data transfer bypass the general purpose computer-memory complex 18 is advantageous. It enables the transfer of data/information at tremendous bandwidth. Furthermore, because the computer-memory complex 18 complex is less loaded, it is more available to provide or support other functions, such as, for example, a HTTP service, a NFS service, and a CIFS service. Thus, by reducing the workload and responsibilities of computer-memory complex 18, node controller 12 facilitates and optimizes the transfer of data and information through node 10.

Exemplifying Implementation for a Node

Figure 2:
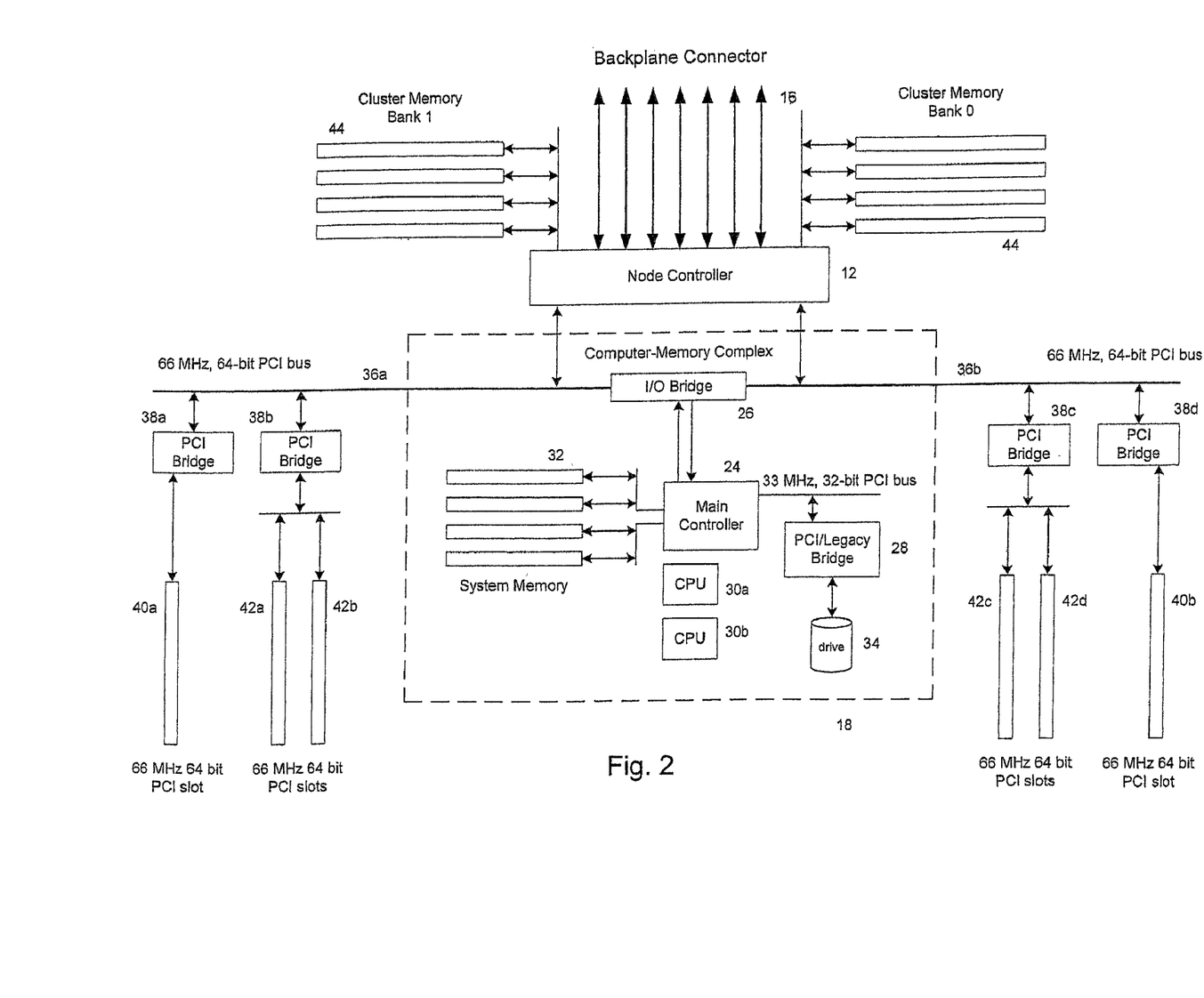
FIG. 2 illustrates an exemplifying implementation for a node, according to an embodiment of the present invention.

FIG. 2 illustrates an exemplifying implementation for a node 10, according to an embodiment of the present invention. Within this implementation, computer-memory complex 18 and node controller 12 may be implemented with one or more integrated circuit (IC) devices mounted on a suitable system board connected to other nodes via a backplane connector.

In general, computer-memory complex 18 can be implemented using a multi-processor capable chipset. As shown, the chipset can include a main controller 24, an input/output (I/O) bridge 26, and a PCI/Legacy bridge 28. In one embodiment, main controller 24, I/O bridge 26, and PCI/Legacy bridge 28 can be implemented with a "Champ North Bridge," a "Champion Input/Output (I/O) Bridge (CIOB)," and a "South Bridge," respectively, all commercially available from ServerWorks. Other chipsets can also be used.

One or more central processing units (CPUs) 30, which are separately labeled 30*a* and 30*b*, generally provide processing capability for the control of data transfers through node 10. Each CPU 30 can be implemented with any suitable processing device, such as, for example, a PENTIUM III by Intel Corporation.

One or more slots 32 connect main controller 24 to system memory. For clarity, only one slot 32 is labeled. Each slot 32 may hold a suitable memory device for implementing system memory. System memory can be implemented, for example, with synchronous dynamic random access memory (SDRAM). System memory generally functions to store data and information used in controlling transfers for node 10. System memory is not required to cache data for bulk transfers through node 10 as this function can be performed by cluster memory at the node.

A local drive 34 is connected to PCI/Legacy bridge 28. Drive 34 can be used to boot the local operating system for computer-memory complex 18 and to back up local data from system memory in the event of a power failure.

Two peripheral component interconnect (PCI) buses 36 are supported by computer-memory complex 18. These PCI buses, which are separately labeled 36a and 36b, can each be a 66 MHz, 64-bit bus. A number of PCI bridges 38 are provided for each bus. As depicted, PCI bridges 38a and 38b are provided for PCI bus 36a, and PCI bridges 38c and 38d are provided for PCI bus 36b. PCI buses 36 and the respective PCI bridges 38 support one or more PCI slots to which a host device or a storage device can be connected. In this embodiment, each PCI bus 36 supports one 66 MHz, 64-bit PCI slot 40 (separately labeled 40a and 40b) and two 66 MHz, 64-bit PCI slots 42 (separately labeled 42a, 42b, 42c, and 42d). Collectively, PCI buses 36, PCI bridges 38, and PCI slots 40 and 42 support or provide an implementation for connections 14 described with reference to FIG. 1.

Node controller 12 resides on both PCI buses 36, and thus may transfer data/information to and from host devices and storage devices directly (i.e., without routing through computer-memory complex 18). Node controller 12 can be implemented as an application specific integrated circuit (ASIC). One or more slots 44 connect node controller 12 to cluster memory. Although eight slots 44 are shown, for clarity only two of these slots 44 are labeled in FIG. 2. Each slot 44 can hold a suitable memory device for implementing cluster memory.

Cluster memory may be implemented in banks which, as depicted, are separately labeled "Cluster Memory Bank 1" and "Cluster Memory Bank 0." In one embodiment, each bank may comprise a number of dual in-line memory modules (DIMMs), each DIMM being held in a separate slot 44. Each DIMM can be a synchronous dynamic random access memory (SDRAM) of up to 1 GByte capacity. Thus, the total capacity for both banks of cluster memory in node 10 can be eight GBytes.

The memory banks can be accessed with long bursts so that the sustainable bandwidth is close to the peak bandwidth. In one embodiment, each bank of cluster memory is eight bytes wide and operates at 133 MHz, thus resulting in a peak bandwidth of 1064 MBytes/s. The aggregate bandwidth of the two banks is approximately two GBytes/s.

Unlike the system memory in a general-purpose computer-memory complex, cluster memory is not bottlenecked by the limitations or constraints of a system bus (e.g., PENTIUM bus). Rather, because data is carried in and out of cluster memory by two PCI buses, transfer bandwidth can be approximately the full aggregate bandwidth of these two PCI buses. Since each 66 MHz, 64-bit PCI bus is capable of transferring 500 Mbytes/s, the two PCI buses alone can contribute about 1 GByte/s of cluster memory bandwidth, which exceeds the achievable bandwidth on a system bus.

Node Controller

Figure 3:
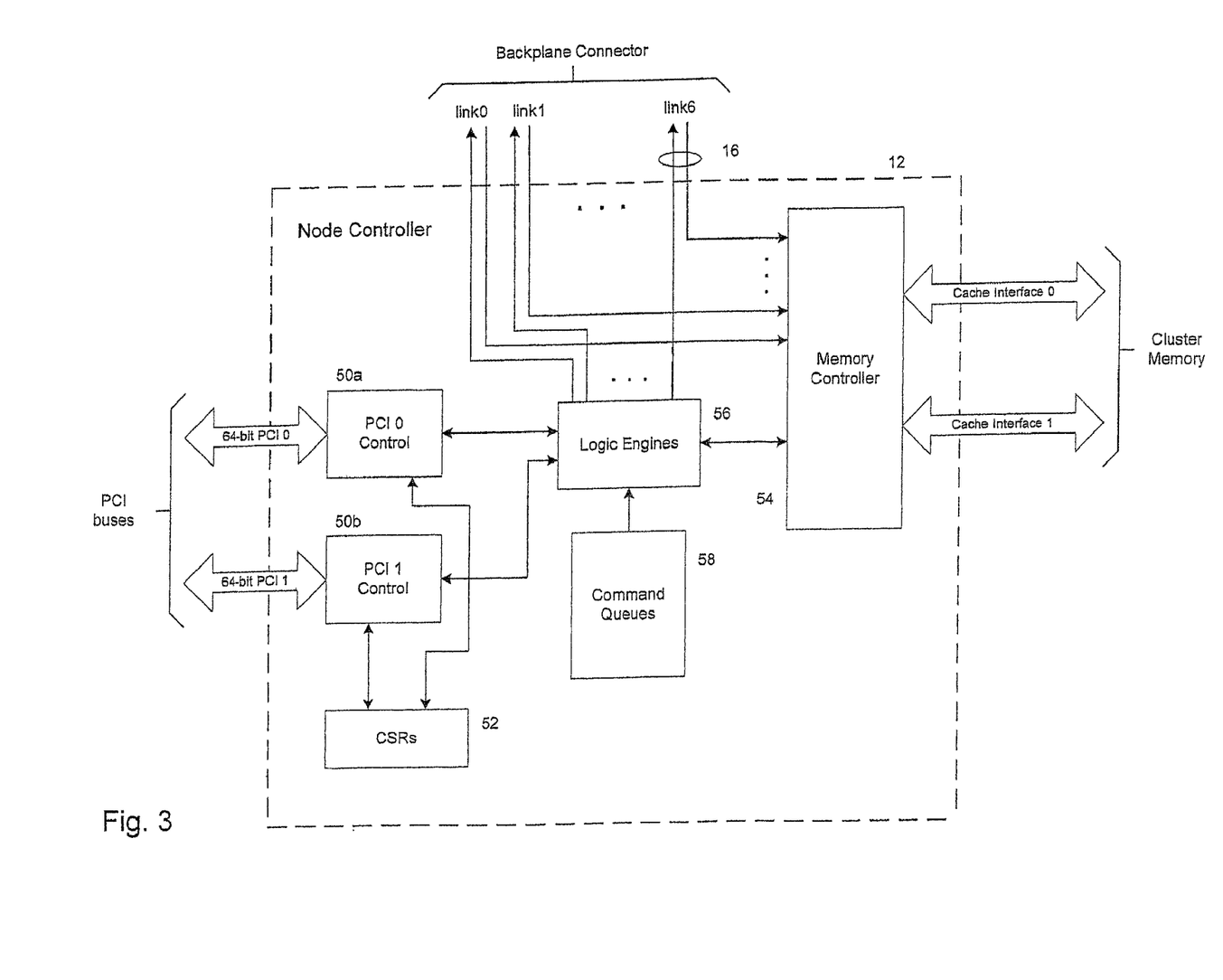
FIG. 3 illustrates an exemplifying implementation for a node controller, according to an embodiment of the present invention.

FIG. 3 illustrates an exemplifying implementation for a node controller 12, according to an embodiment of the present invention. In this implementation, node controller 12 includes one or more PCI control interfaces 50, which are separately labeled 50a and 50b. Each PCI control interface 50 provides an interface with a respective PCI bus ("PCI 0" or "PCI 1"). Each such bus can be a 64-bit, 66 MHz bus. PCI control interfaces 50 allow node controller 12 to appear as a PCI device on each bus. Configuration software in the respective computer-memory complex 18 may view node controller 12 as separate and independent devices on the two PCI buses.

Control and status registers (CSRs) 52 are connected to each PCI control interface 50. Control and status registers 52 generally function to maintain or keep track of various information used in node controller 12, or control information to be sent over communication paths 16 to another node 10. Thus, for example, control and status registers 52 may maintain the current values for flags or other control signals used in node controller 12. These may include interrupt, mask, and command signals. Also, control and status registers 52 may maintain base addresses for data. Other parts of node controller 12, as well as external PCI devices, may read or write into control and status registers 52.

Node controller 12 may act as a slave device (target), thus allowing other devices on each PCI bus (e.g., host devices or the CPUs of computer-memory complex 18) to read from or write to cluster memory 20. PCI devices may also read or write into the control and status registers 52.

A memory controller 54 generally functions to provide or support an interface for the cluster memory 20 of respective node 10 and/or a remote node. In one embodiment, a separate memory controller 54 is provided to support each of two 72-bit, 133 MHz SDRAM channels (0 and 1) for the local cluster memory 20 and communication paths 16 extending out to the cluster memories of other nodes.

As depicted, each communication path 16 may comprise two separate interconnect links. For each such pair of links, one link carries data/information out of node controller 12 to the respective node 10, and the other link carries data/information from the same node 10 into node controller 12 (particularly, memory controller 54). In one embodiment, the links are eighteen bits wide and run nominally at 133 MHz. If data is sampled on both edges of a clock, the data rate is 532 MB/s for each link.

Cluster memory 20 may be programmed or divided into multiple regions. Each region may be, for example, a line of sixty-four bytes, and can be associated with a remote node 10. Node controller 12 may be configured so that the writing of data into a particular region of cluster memory 20 causes the same data to be sent to the associated remote node via the respective interconnect link. Accordingly, the data is "mirrored" at the cluster memory of the remote node. Node controller 12 may also be configured so that the writing of data to other regions causes the same data to be "broadcast"—i.e., the data is sent over every outgoing interconnect link to the respective remote nodes.

One or more logic engines 56 are coupled to PCI control interfaces 50, memory controller 54, and the outgoing interconnect links of communication paths 16. In one embodiment, logic engines 56 comprise "exclusive OR" (XOR) engines. Logic engines 56 may also include error-correcting code (ECC) scrub, Direct Memory Access (DMA) engines, Bzero engines, and/or parity engines. Logic engines 56 in node controller 12 can operate (e.g., perform an XOR operation) on data from up to thirteen sources (in local cluster memory 20 or PCI buses 36) and write the result into a destination (in either local cluster memory 20, one of the two PCI buses 36, or one of communication paths 16). The sources, destination, length, and operation type and flags are programmed in one or more logic control blocks (LCBs) stored in respective command queues 58. In one embodiment, each logic control block can be an XOR control block (XCB). Each logic control block can specify or relate to one or more commands for actions to be taken at or by node controller 12. Logic engines 56 take "jobs" off the head or consumer end of the queues (as described below). In one embodiment, there are multiple logic engines 56 in node controller 12. While one logic engine 56 is operating on a logic control block from a queue, the other logic engines 56 will only operate on logic control blocks from other queues. Thus, only one logic control block from any given queue may be active at a time.

Logic engines 56 provide or support a number of different functions in node controller 12. For example, logic engines 56 may support a redundant array of inexpensive disks (RAID) configuration. Specifically, logic engines 56 may compute RAID parity when initializing a RAID volume or writing a full RAID strip, reconstruct data when one disk in a RAID group is bad, and compute new RAID parity from old parity read from disk and partial parity received over the interconnect link from another node. Logic engines 56 may perform other types of operations, such as, for example, checksums. Checksums are codes that can be used to ensure that data is valid.

In one embodiment, logic engines 56 can read multiple regions of local cluster memory 20, perform a particular logic operation (e.g., an "exclusive OR" operation) on all of the regions, and write the result back to another region of local cluster memory 20. This is used to accelerate the writing of a full RAID strip and to speed up reconstruction of data after disk failure in a RAID group. A separate logic engine 56 may provided for each interconnect link. Each such logic engine 56 can perform a logic operation on multiple regions of local cluster memory 20 and place the result into the cluster memory at a remote node. This is used in writing of a RAID partial strip to compute the new parity. Each link logic engine 56 can also be used to copy a region of local cluster memory 20 into a remote node's cluster memory.

Command queues 58 are connected to logic engines 56. Queues 58 store the logic control blocks which can be processed by logic engines 56. Each logic control block may specify a number of sources upon which a logic operation can be performed, and the result sent to a particular destination. Each source can be a region of cluster memory 20 or one of PCI buses 36. The destination can be one of the outgoing interconnect links (e.g., communication paths 16), a PCI bus 36, or a region of cluster memory 20. A separate command queue 58 may be provided for each destination.

With the functionality described herein, node controller 12 accelerates the storage of data/information and communication through node 10, thereby enhancing performance and availability. Furthermore, because memory control, links, PCI control, and logic engines may be integrated on a single integrated circuit device (e.g., application specific integrated circuit (ASIC)) in at least one embodiment, such implementation for node controller 12 substantially reduces or eliminates the need to transfer data between components over system resources, thereby consuming less system resources and greatly enhancing performance.

For example, in an embodiment in which node controller 12 is implemented as part of a system board for a node 10, the node controller may communicate and cooperate with node controllers on other system boards to transfer data/information therebetween, for example, in bulk transfers. These node controllers 12 can interact to perform peer-to-peer transfers-i.e., transfers between two PCI devices other than the main computer system comprising CPUs and system memory (i.e., computer-memory complex 18 in each node 12). This is advantageous for a number of reasons. Because the node controllers 12 primarily handle the peer-to-peer transfers, the main computer systems in each system board are made more available for other functions. At the same time, "normal" PCI bus transfers to the main computer systems can be used for control information without requiring separate buses. Furthermore, bulk transfers of data avoid the limitations of a typical main computer system, such as, for example, relatively narrow bandwidth on system buses and limited capacity system memory. Because bulk data transfers are carried out using the large capacity, relatively wide cluster memory and over high-speed links, transfers between nodes can be very fast. Since cluster memory 20 is separately provided for each node controller 10, no additional transfer is required to transport data to another node controller at a different node. These optimize the efficiency and performance of a data storage system incorporating such node controllers 12.

Node Controller Address Space

Figure 4:
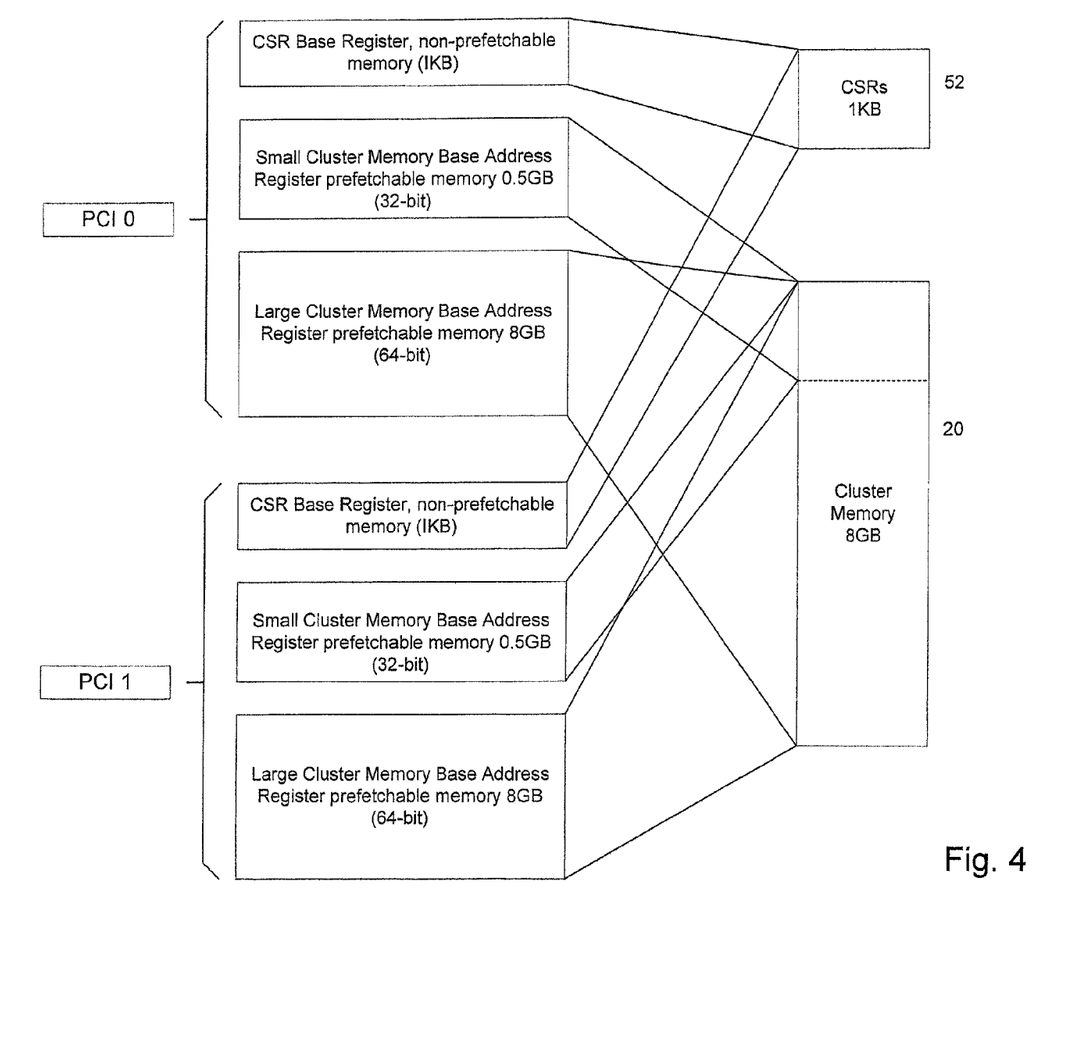
FIG. 4 illustrates an exemplifying allocation of memory, according to an embodiment of the present invention.

FIG. 4 illustrates an exemplifying address space 60 for node controller 12, according to an embodiment of the present invention. In general, within node 10, node controller 12 appears as a PCI device on each of two PCI buses 36a, 36b (see FIG. 2), which may be referred to as "PCI 0" and "PCI 1." PCI device configuration software treats node controller 12 as a separate and independent device on each bus 36 (each with its own PCI configuration header) and allocates space for node controller 12 on both buses. Since the addresses on the two PCI buses 36a, 36b are different, address space 60 provides separate PCI base address registers in control and status registers (CSRs) 52 and cluster memory 20 for each bus. Nevertheless, the two PCI buses 36a, 36b may physically share many of the other PCI configuration header registers.

Referring to FIG. 4, regions in both control and status registers 52 and cluster memory 20 can be mapped on PCI for node controller 12. As shown, control and status registers 52 provide a 1 KB region which may be mapped as non-prefetchable memory. Cluster memory 20 provides 0.5 GB region which may be mapped as prefetchable memory. In one embodiment, the base address register of cluster memory 20 specifies sufficient space for all of the local cluster memory, which could be more than 4 GB. Since this requires 64-bit PCI addressing, the base address register can be a 64-bit base address register. However, because there may be system hardware and software restrictions that limit the available address space, address space 60 provides two cluster memory base address registers: a small cluster memory base address register and a large cluster memory base address register. The small cluster memory base address register may map only the top 0.5 GB of cluster memory 20, whereas the large cluster memory base address register may map all of cluster memory 20 (up to 8 GB). As shown, the same cluster memory 20 is mapped to both PCI buses. An exemplifying configuration for the node controller address space is outlined below in Tables 1-4.

TABLE 1

Node controller PCI Configuration Space Header

| Byte 3 | Byte 2 | Byte 1 | Byte 0 | |
|---|---|---|---|---|
| Device ID = 1 | | Vendor ID = 0x1590 | | 00h |
| Status | | Command | | 04h |
| Class Code = 0xFF0000 | | | Revision ID = 0x0 | 08h |
| BIST | Header Type = 0x00 | Latency Timer | Line Size | 0Ch |
| CSR Base Address Register | | | | 10h |
| Small Cluster Memory Base Address Register | | | | 14h |
| Large Cluster Memory Base Address Register [31:0] | | | | 18h |
| Large Cluster Memory Base Address Register [64:32] | | | | 1Ch |
| (Unused) Base Address Register = 0x0 | | | | 20h |
| (Unused) Base Address Register = 0x0 | | | | 24h |
| Cardbus CIS Pointer | | | | 28h |
| Subsystem ID | | Subsystem Vendor ID | | 2Ch |
| (Unused) Expansion ROM Base Address = 0x0 | | | | 30h |
| Reserved = 0x0 | | | (Unused) Capabilities Pointer = 0x0 | 34h |
| Reserved = 0x0 | | | | 38h |
| Max_lat | Min_Gnt | Interrupt Pin | Interrupt Line | 3Ch |

TABLE 2

CSR Base Address Register

| Field | Bits | Mode | Reset State | Description |
|---|---|---|---|---|
| Base Address | 31:10 | RW | 0 | Base address [31:10] programmable to set base address of node controller CSRs. |
| Base Address | 9:4 | R | 0 | Hardwired to 0, indicates that 1 KB of space is required for node controller CSRs. |
| Prefetchable | 3 | R | 0 | Indicates that CSRs are not prefetchable. |
| Type | 2:1 | R | 00 | Indicates that the CSR Base Address Register is a 32-bit register and can be mapped anywhere in the 32-bit memory space. |
| Space | 0 | R | 0 | Indicates that this is a memory space. |

TABLE 3

Small Cluster Memory Base Address Register

| Field | Bits | Mode | Reset State | Description |
|---|---|---|---|---|
| Base Address | 31:29 | RW | 0 | Base address [31:29] programmable to set base address of Small Cluster Memory Space |
| Base Address | 28:4 | R | 0 | Hardwired to 0, indicates that 512 MB of space is required for the Small Cluster Memory Space. |
| Prefetchable | 3 | R | 1 | Indicates that Cluster Memory space is prefetchable. |
| Type | 2:1 | R | 00 | Indicates that the Small Cluster Memory Base Address Register is a 32-bit register and can be mapped anywhere in the 32-bit memory space. |
| Space | 0 | R | 0 | Indicates that this is a memory space. |

TABLE 4

Large Cluster Memory Base Address Register

| Field | Bits | Mode | Reset State | Description |
|---|---|---|---|---|
| Base Address | 63:33 | RW | 0 | Base address [63:33] programmable to set base address of Large Cluster Memory Space |
| Base Address | 32:4 | R | 0 | Hardwired to 0, indicates that 8 GB of space is required for the Small Cluster Memory Space. |
| Prefetchable | 3 | R | 1 | Indicates that Cluster Memory space is prefetchable. |
| Type | 2:1 | R | 10 | Indicates that the Large Cluster Memory Base Address Register is a 64-bit register and can be mapped anywhere in the 64-bit address space. |
| Space | 0 | R | 0 | Indicates that this is a memory space. |

Command Queues

Figure 5:
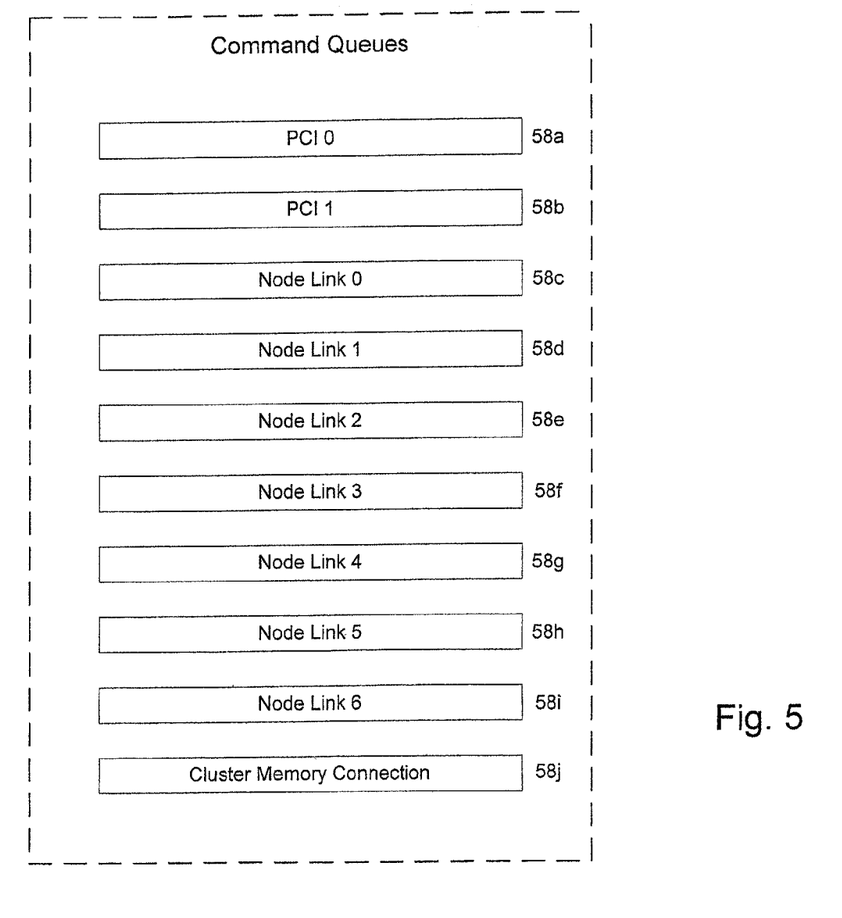
FIG. 5 illustrates a number of exemplifying command queues, according to an embodiment of the present invention.

FIG. 5 illustrates exemplifying command queues 58, according to an embodiment of the present invention. Command queues 58 store a number of command or logic control blocks (LCBs) which can be processed by logic engines 56. As such, command queues 58 can also be referred to as LCB queues. Each logic control block may specify a number of sources upon which a logic operation can be performed, and the result sent to a particular destination. Each source can be a region of cluster memory 20 or one of PCI buses 36. The destination can be one of the outgoing interconnect links (e.g., communication paths 16), a PCI bus, or a region of cluster memory 20.

A separate command queue 58 may be provided for each destination. As shown, these queues 58 include command queues 58a and 58b for first and second PCI buses (PCI 0, PCI 1); command queues 58c, 58d, 58e, 58f, 58g, 58h, and 58i for a number of communication path node links (Node Link 0, Node Link 1, Node Link 2, Node Link 3, Node Link 4, Node Link 5, and Node Link 6); and command queue 58j for a cluster memory connection.

Figure 6:
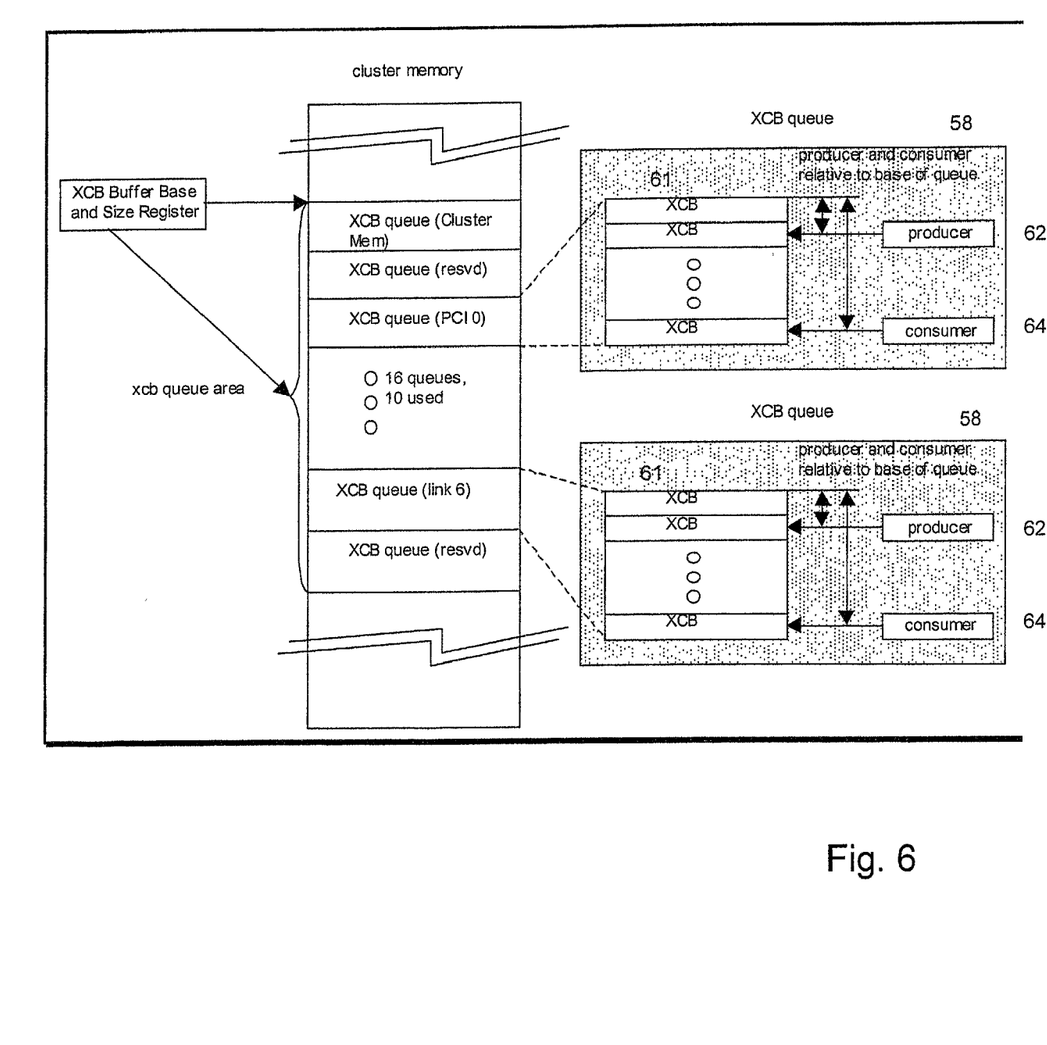
FIG. 6 illustrates exemplifying logic control blocks along with associated producer and consumer registers of command queues, according to an embodiment of the present invention.

In one embodiment, as shown in FIG. 6, each command or LCB queue 58 may be implemented as a separate buffer 61. Each buffer 61 may operate as a circular queue that wraps around from the end to the beginning of the buffer 61. A plurality of logic control blocks (LCBS) may be stored into each buffer 61.

Furthermore, as depicted in FIG. 6, an LCB producer register 62 and an LCB consumer register 64 may be associated with each command queue 58. The LCB producer register 62 and the LCB consumer register 64 can be control and status registers 52 (FIG. 3). The LCB producer register 62 specifies a particular address of the command queue 58 into which the next logic control block should be written. The LCB consumer register 64 specifies a particular address of the command queue 58 from which the next or current logic control block should be read in order to operate on the same. In one embodiment, software at node controller 12 writes to the producer end of the command queue (indicated by the LCB producer register 62). Hardware at node controller 12 takes logic control blocks off the consumer end of the queue (indicated by the LCB consumer register 64) so that they may be operated on by logic engines 56.

If the addresses specified by LCB consumer register 64 and LCB producer register 62 are the same, the command queue 58 is empty and the logic engines 56 skip that queue. When software increments the LCB producer register 62 for a queue 58, the next logic engine 56 that services such queue 58 reads the next logic control block and starts executing its task. In one embodiment, software may only write to the LCB producer registers 62; the LCB consumer registers 64 cannot be directly written to by software since hardware writes to them as tasks are completed.

An exemplifying configuration or arrangement for an logic control block is outlined below in Table 5.

TABLE 5

Logic Control Block (LCB)

| Field | Bits | Description |
|---|---|---|
| LENGTH [21:0] | Dword0 [31:10] | Length of blocks in 64-byte lines. |
| INTDEST | Dword0 [9] | 1 = Interrupt Destination node when done. |
| INTSRC | Dword0 [8] | 1 = Interrupt Source node when done. |
| NSRC | Dword0 [7:4] | Number of sources for the logic (e.g., XOR) and PAR operations. This field is used only when OP = XOR and OP = PAR and is ignored for all other OP values. SRC0 xor SRC1 . . . xor srcNSRC => DEST. When NSRC = 0, the operation is a copy from SRC0 => DEST. NSRC = E, F will be treated as NSRC = D since srcE and srcF do not exist. |

TABLE 5-continued

Logic Control Block (LCB)

| Field | Bits | Description |
|---|---|---|
| REMOP | Dword0 [3:2] | 0 => No remote operation<br>1 => increment remote receive counter by LENGTH [3:0] in 64 byte units<br>2 => clear remote receive counter<br>3 => reserved |
| OP | Dword0 [1:0] | 0: Zero => DEST<br>1: ECC scrub DEST, atomically read and write back the DEST. If there are correctable errors on the read, these are corrected before writing back. Correctable ECC errors are not reported since scrubbing is used once a correctable ECC error is detected.<br>2: XOR (src0 . . . srcNSRC) => DEST. Each line of the DEST is the XOR of the corresponding lines from all the specified sources.<br>3: PAR (src0 . . . srcNSRC) => DST. Only one line (64 bytes) of the destination is written, and it contains the bit-wise parity (cumulative XOR) of all the lines of the specified sources. |
| DEST_ADDR [37:6] | Dword1 [31:0] | Destination address (local cluster memory, PCI or link) |
| SRC0_ADDR [37:6] | Dword2 [31:0] | Source 0 address (local cluster memory or PCI) |
| SRC1_ADDR [37:6] | Dword3 [31:0] | Source 1 address (local cluster memory or PCI) |
| SRC2_ADDR [37:6] | Dword4 [31:0] | Source 2 address (local cluster memory or PCI) |
| SRC3_ADDR [37:6] | Dword5 [31:0] | Source 3 address (local cluster memory or PCI) |
| SRC4_ADDR [37:6] | Dword6 [31:0] | Source 4 address (local cluster memory or PCI) |
| SRC5_ADDR [37:6] | Dword7 [31:0] | Source 5 address (local cluster memory or PCI) |
| SRC6_ADDR [37:6] | Dword8 [31:0] | Source 6 address (local cluster memory or PCI) |
| SRC7_ADDR [37:6] | Dword9 [31:0] | Source 7 address (local cluster memory or PCI) |
| SRC8_ADDR [37:6] | DwordA [31:0] | Source 8 address (local cluster memory or PCI) |
| SRC9_ADDR [37:6] | DwordB [31:0] | Source 9 address (local cluster memory or PCI) |
| SRCA_ADDR [37:6] | DwordC [31:0] | Source A address (local cluster memory or PCI) |
| SRCB_ADDR [37:6] | DwordD [31:0] | Source B address (local cluster memory or PCI) |
| SRCC_ADDR [37:6] | DwordE [31:0] | Source C address (local cluster memory or PCI) |
| SRCD_ADDR [37:6] | DwordF [31:0] | Source D address (local cluster memory or PCI) |

With respect to the configuration given in Table 5, the destination address (DEST_ADDR) can be in local cluster memory 20, on one of the two PCI buses 36a, 36b, or on one of the links (e.g., communication paths 16). The source addresses (SRC0_ADDR through SRCD-ADDR) can be in local cluster memory 20 or one of the two PCI buses 36a, 36b. Preferably, the destination address is implicit in the queue, but each source address must specify whether it is in local cluster memory 20 or the PCI buses 36.

The cluster memory 20 of a particular node 10 can be written to by the logic engines 56 of a remote node. Link memory protection is used to limit the local memory locations that can be written via a link by the logic engines of the remote node. That is, each link is provided with a specific range of local cluster memory 20 which it can access. To accomplish this, for each link, node controller 12 may comprise a base and bounds register pair which specifies the memory range. The base and bounds register pair comprises a link protection base register and a link protection bounds register, which can be control and status registers 52 (FIG. 3). The link protection base register holds or contains information for a base address in local cluster memory 20. The link protection bounds register holds or contains information for a bounds address in local cluster memory 20. The respective link is allowed to write to any address starting from and including the base address up to (but not including) the bounds address.

In one embodiment, when a logic engine 56 encounters an error while operating on particular logic control block of a command queue 58, that queue 58 is suspended and a corresponding bit for the specific error is set in a control and status register 52 for logic engine 56. The errors encountered may include, for example, programming errors for a specific destination (e.g., links, PCI buses, or cluster memory). The command queue 58 can be restarted by clearing the bit; the logic control block associated with that the error, however, is not restarted.

Memory Banks

Figure 7:
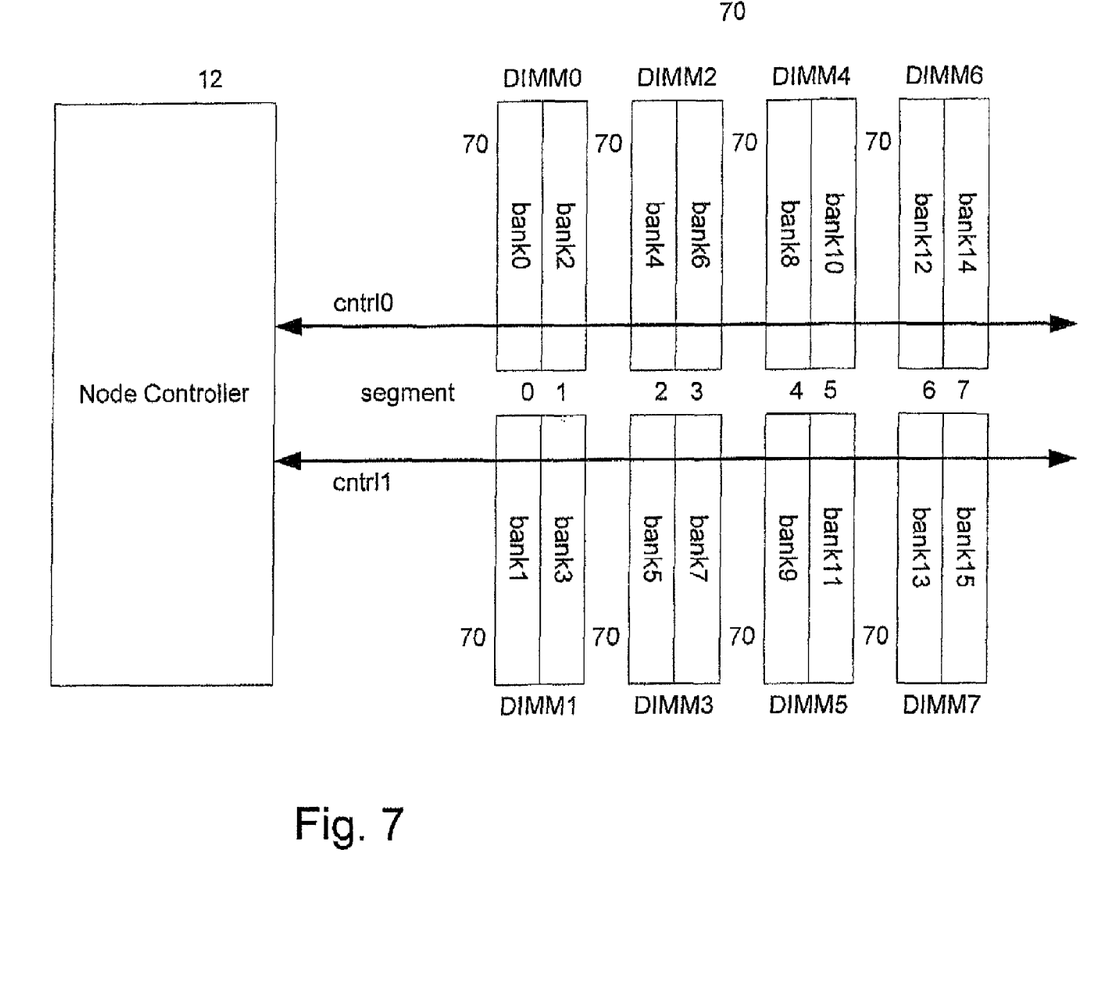
FIG. 7 illustrates a number of memory banks under the control of a node controller, according to an embodiment of the present invention.

FIG. 7 illustrates a number of memory banks under the control of a node controller 12, according to an embodiment of the present invention. These memory banks can be contained in a number of Dual In-line Memory Modules (DIMMs) 70, which are separately labeled DIMM0, DIMM1, DIMM2, DIMM3, DIMM4, DIMM5, DIMM6, and DIMM7. As depicted, DIMM0 contains bank0 and bank2, DIMM1 contains bank1 and bank3, DIMM2 contains bank4 and bank6, DIMM3 contains bank5 and bank7, DIMM4 contains bank8 and bank10 , DIMM5 contains bank9 and bank11, DIMM6 contains bank12 and bank14, and DIMM7 contains bank13 and bank14. Each DIMM 70 in general can have one or two physical banks. In one embodiment, each DIMM 70 may include a number of Synchronous DRAMs (SDRAMs). The number and width of the DRAMs may determine the physical memory banks.

Node controller 12 may have two memory controllers 54 (see FIG. 3), each of which may support a separate data path (cntr10 and cntr11) to DIMMS 70. In one embodiment, each memory controller 54 may support a 72-bit wide (64-bit data and 8-bit ECC) data path to four 72-bit DIMMs 70. All memory operations may performed in units of 64-byte lines. An entire line of memory may be accessed in a single burst of length 8-cycles from a single memory bank on one DIMM 70. DIMMs 70 may be installed as pairs of identical DIMMs, one for each controller 54. The memory can be interleaved two-ways on 64-byte line boundaries across the memory controllers 54. One memory controller 54 may control even-numbered memory banks on even-numbered DIMMs 70, and the other memory controller 54 may control odd-numbered memory banks on odd-numbered DIMMs 70. Each memory bank can be selected by the associated memory controller 54 with a respective chip select line CS[15:0], where CS[x] is associated with memory bank x.

Memory decoding registers may be provided for maintaining data regarding the chip select lines. One address bit can be used to select between the even-numbered memory banks and the odd-numbered memory banks. Each pair of identical memory banks may be referred to as a segment. The memory decoding registers determine the range of addresses that activate a given segment of memory. In one embodiment, the top of each segment is specified by a respective 32-bit memory decoding register that specifies the first address of the next segment, or equivalently, the cumulative total memory (in units of 128 MB) in the memory bank plus all the lower numbered segments. An exemplifying address block for memory segments is illustrated in Table 6 below.

TABLE 6

Memory Segment Top Address Block

| Register | Description |
|---|---|
| Segment 0 (bank 0 + 1) Top | 1 + Address of top of segment 0 = total memory in segment 0 |
| Segment 1 (bank 2 + 3) Top | 1 + Address of top of segment 1 = total memory in segment 0 through segment 1 |
| Segment 2 (bank 4 + 5) Top | 1 + Address of top of segment 2 = total memory in segment 0 through segment 2 |
| Segment 3 (bank 6 + 7) Top | 1 + Address of top of segment 3 = total memory in segment 0 through segment 3 |
| Segment 4 (bank 8 + 9) Top | 1 + Address of top of segment 4 = total memory in segment 0 through segment 4 |
| Segment 5 (bank 10 + 11) Top | 1 + Address of top of segment 5 = total memory in segment 0 through segment 5 |
| Segment 6 (bank 12 + 13) Top | 1 + Address of top of segment 6 = total memory in segment 0 through segment 6 |
| Segment 7 (bank 14 + 15) Top | 1 + Address of top of segment 7 = total memory in segment 0 through segment 7 |

In one embodiment, a memory control register is provided for each per pair of identical DIMMs 70. The memory control register can be a control and status register 52 (see FIG. 3). Each memory control register controls the row address strobe (RAS), column address strobe (CAS), and bank address generation, and memory timing. An exemplifying illustration for memory control register is provided in Table 7 below.

TABLE 7

Memory Control Register

| Field | Bits | Mode | Reset State | Description |
|---|---|---|---|---|
| Resvd | 31:16 | R | 0 | Reserved |
| DPL | 15 | RW | 0 | Data in to precharge time. 0 => 2 cycles, 1 => 1 cycle. Determined by Tdpl. |
| DAL | 14:13 | RW | 0 | Data in to activate (next RAS) time. 0 => 5 cycles, 1 => 4 cycles, 2 => 3 cycles, 3 => reserved. Determined by Tdal. |
| RASPRE | 12 | R | 0 | RAS precharge time (precharge time before RAS). 0 => 3 cycles, 1 => 2 cycles. Determined by Trp. |
| BNKCYC | 11:10 | RW | 0 | Bank Cycle time (also called RAS cycle time). 0 => 10 cycles, 1 => 9 cycles, 2 => 8 cycles, 3 => 7 cycles. Determined by Trc, nominally 67.5 ns for PC133 SDRAM or 9 cycles at 133 MHz. |
| RASCASD | 9 | RW | 0 | RAS to CAS delay. 0 => 3 cycles, 1 => 2 cycles. Determined by the Trcd timing parameter of the DRAM and the clock cycle time. Nominally Trcd = 20 ns, for which 3 clocks is sufficient up to 6.67 ns clock cycle or 150 MHz. |
| CASLAT | 8 | RW | 0 | CAS Latency, or CAS to data out delay. 0 => 3 cycles, 1 => 2 cycles. |
| Resvd | 7:5 | R | 0 | Reserved |
| ECCEN | 4 | RW | 0 | Enable ECC error checking. After reset ECC error checking is disabled. This is used to initialize ECC in memory. Note that ECC may be generated and written on writes. |

TABLE 7-continued

Memory Control Register

| Field | Bits | Mode | Reset State | Description |
|---|---|---|---|---|
| BEN1 | 3 | RW | 0 | DIMM physical bank 1 enable (1 => enabled). This bit must be enabled only on DIMMs that have two banks. |
| BEN0 | 2 | RW | 0 | DIMM physical bank 0 enable (1 => enabled). On DIMMs that have one bank, BEN0 should be enabled, not BEN1. |
| COL | 1:0 | RW | 0 | Number of column address bits 0 => 9<br>1 => 10<br>2 => 11<br>3 => 12 |

A single memory mode register may be provided for both memory controllers 54. The memory mode register, which may be a control and status register 52 (FIG. 3), can be used to accelerate programming of the SDRAMS. The SDRAMs are programmed one physical memory bank at a time with the address used to select the bank. An exemplifying illustration for memory mode register is provided in Table 8 below.

TABLE 8

Memory Mode Register

| Field | Bits | Mode | Reset State | Description |
|---|---|---|---|---|
| Resvd | 31:4 | R | 0 | Reserved |
| PGMODE | 3 | RW | 0 | Page mode access for all banks. 0 => Always close the banks after each access. 1 => Keep banks open if possible to take advantage of sequential accesses to the same page. |
| MCTLMODE | 2:0 | RW | 0x0 | Selects the mode for the DRAM operation. 0 => Normal DRAM operation 1 => NOP Commands are issued instead of the normal DRAM access. 2 => All banks precharge commands are issued instead of the normal DRAM access. 3 => CBR (auto refresh) commands are issued instead of the normal DRAM access. 4 => Mode Register Set command is issued instead of the normal DRAM access. 5-7 => Reserved (treated as normal DRAM operation). |

Accordingly, an embodiment of the present invention provides a node controller which can be integrated at a node of a data storage system and architecture. The node controller is separate from any computer-memory complex at the node. The node controller, using cluster memory at the node, controls or coordinates transfers of data through the node. Accordingly, the computer-memory complex at the node is not burdened with such task. Thus, by reducing the workload and responsibilities of computer-memory complex, the node controller facilitates and optimizes the overall operation of the data storage system and architecture.

Although particular embodiments of the present invention have been shown and described, it will be obvious to those skilled in the art that changes or modifications may be made without departing from the present invention in its broader aspects, and therefore, the appended claims are to encompass within their scope all such changes and modifications that fall within the true scope of the present invention.

What is claimed is:

1. A node controller for a node in a data storage system having at least two nodes, the node comprising a computer-memory complex, the node controller distinct and separate from the computer-memory complex, and an input/output bus, the computer-memory complex comprising a central processing unit (CPU), a system memory, and a controller coupling the CPU and the system memory to the input/output bus, the node controller providing control for data transfer through the node, the node controller being operable to be programmed by the computer-memory complex, the node controller comprising:
  a memory controller operable to interface the node controller with (1) a cluster memory that stores data being transferred through the node, and (2) a link coupled to another node controller in another node of the data storage system;
  an input/output bus interface operable to interface the node controller with the input/output bus, at least one host device, and at least one storage device;
  a logic engine coupled to (1) the memory controller, (2) the link, and (3) the input/output bus interface;
  wherein in a first type of data transfer, the logic engine performs a logic operation to a plurality of data from one of a plurality of data sources in the data storage system and writes the result of the logic operation to one of a plurality of data destinations in the data storage system, the data sources comprising the cluster memory and the input/output bus interface, the data destinations comprising the cluster memory, the link, and the input/output bus interface, the logic operation being used to calculate a parity data for writing a full or a partial RAID stripe or to reconstruct a lost data using the parity data.

2. The node controller of claim 1, further comprising:
command queues coupled to the logic engine, the command queues operable to store logic control blocks which can be processed by the logic engine.

3. The node controller of claim 2, further comprising:
a producer register operable to specify a first address of a command queue; and
a consumer register operable to specify a second address of the command queue.

4. The node controller of claim 1, wherein the node controller is implemented as an integrated circuit device.

5. The node controller of claim 1, wherein in a second type of data transfer, the input/output bus interface writes a data into the cluster memory and in response the logic engine copies the data to the another node via the link.

6. The node controller of claim 1, wherein the input/output bus interface comprises a peripheral component interconnect (PCI) control interface and the input/output bus comprises a PCI bus.

7. The node controller of claim 6, wherein the computer-memory complex manages the PCI bus.

8. The node controller of claim 7, wherein the computer-memory complex supports a service selected from the group consisting of a HTTP service, a NFS service, and a CIFS service.

9. The node controller of claim 1, wherein the computer-memory complex is not burdened with temporarily storing data being transferred through the node in the system memory.

10. The node controller of claim 1, wherein the logic operation comprises an XOR operation.

11. A node in a data storage system comprising at least two nodes, the node comprising:
  an input/output bus coupled to at least one host device and at least one storage device;
  a computer-memory complex, comprising:
    a central processing unit (CPU);
    a system memory storing information for controlling data transfer through the node; and
    a controller coupling the CPU and the system memory to the input/output bus; and
  a node controller distinct and separate from the computer-memory complex, the node controller providing control for data transfer through the node, the node controller being operable to be programmed by the computer-memory complex, the node controller comprising:
    a memory controller operable to interface the node controller with a cluster memory of the node, the cluster memory storing data being transferred through the node;
    an input/output bus interface operable to interface the node controller with the input/output bus;
    a logic engine coupled to the memory controller, the input/output bus interface, and a link to another node of the data storage system;
    wherein at least one of the host device and the storage device coupled to the input/output bus is able to read and write the cluster memory via the input/output bus, the logic engine is able to transfer data from the cluster memory to the another node via the link, and the memory controller is able to receive data from the another node via the link.

12. The node of claim 11, wherein in a data transfer, the logic engine performs a logic operation on a plurality of data from at least one of the input/output bus and the cluster memory, and writes a result of the logic operation to at least one of the input/output bus, the cluster memory, and the link.

13. The node of claim 12, further comprising a command queue operable to store a logic control block to be processed by the logic engine, the logic control block specifying at least one data source and at least one data destination for the logic operation.

14. The node of claim 13, further comprising:
a producer register operable to specify a first address of the command queue; and
a consumer register operable to specify a second address of the command queue.

15. The node of claim 12, wherein the logic engine comprises an exclusive OR (XOR) engine.

16. The node of claim 15, wherein the XOR engine is used to calculate a parity data for writing a full or a partial RAID stripe.

17. The node of claim 15, wherein the XOR engine is used to reconstruct a lost data using a parity data.

18. The node of claim 11, wherein the node controller is implemented as an integrated circuit device.

19. The node of claim 11, wherein the input/output bus interface comprises a peripheral component interconnect (PCI) control interface and the input/output bus comprises a PCI bus.

20. The node of claim 11, wherein in a data transfer, the input/output bus interface writes a data into the cluster memory and in response the logic engine copies the data to the another node via the link.

21. The node of claim 11, wherein the computer-memory complex supports a service selected from the group consisting of a HTTP service, a NFS service, and a CIFS service.

22. The node of claim 11, wherein the computer-memory complex is not burdened with temporarily storing data being transferred through the node in the system memory.

23. The node of claim 11, further comprising:
another input/output bus interface operable to interface the node controller with another input/output bus coupled to the computer-memory complex and at least one of another host device and another storage device, wherein the computer-memory complex, the another host device, and the another storage device are able to read and write the cluster memory via the another input/output bus.

24. A node in a data storage system having at least two nodes for providing access to a data storage facility, the node comprising a computer memory complex, a node controller distinct and separate from the computer-memory complex, and an input/output bus, the computer-memory complex comprising a central processing unit (CPU), a system memory, and a controller coupling the CPU and the system memory to the input/output bus, the node controller providing control for data transfer through the node, the node controller being operable to be programmed by the computer-memory complex, the node controller comprising:
an input/output bus interface operable to interface the node controller with the input/output bus, at least one host device, and at least one storage device;
a memory controller operable to interface the node controller with a cache memory in the node;
one or more logic engines coupled to the input/output bus interface, to the memory controller, and to a link that can be coupled to another node in the data storage system;
wherein the node controller is arranged so that the computer-memory complex, the host device, and the storage device are able to access the node controller via the input/output bus so that the host device and the storage device are able to read and write the cache memory via the input/output bus; and
wherein the logic engine is able to transfer data from the cache memory to the another node in the data storage system via the link, and the memory controller is able to receive data from the another node in the data storage system via the link.

25. The node of claim 24, wherein the logic engine is operable to perform a logic operation in a data transfer on a plurality of data from at least one of the input/output bus and the cluster memory, and to write a result of the logic operation to at least one of the input/output bus, the cluster memory, and the link.

26. The node of claim 25, wherein the logic engine comprises an exclusive OR (XOR) engine.

27. The node of claim 26, wherein the XOR engine is arranged to calculate a parity data for writing a full or a partial RAID stripe.

28. The node of claim 26, wherein the XOR engine is arranged to reconstruct lost data using a parity data.

29. The node of claim 25, the node controller further comprising a command queue operable to store a logic control block to be processed by the logic engine, the logic control block specifying at least one data source and at least one data destination for the logic operation.

30. The node of claim 29, the node controller further comprising:
a producer register operable to specify a first address of the command queue; and
a consumer register operable to specify a second address of the command queue.

31. The node of claim 24, wherein the node controller is implemented as an integrated circuit device.

32. The node of claim 24, wherein the input/output bus interface comprises a peripheral component interconnect control interface and the input/output bus comprises a peripheral component interconnect bus.

33. The node of claim 24, wherein the node controller is arranged to send data written into the cache memory to the another node via the link.

34. The node of claim 24, wherein the computer-memory complex is arranged to support a service selected from the group consisting of a HTTP service, a NFS service, and a CIFS service.

35. The node of claim 24, wherein the computer-memory complex is not burdened with temporarily storing data being transferred through the node in the system memory.

36. The node of claim 24, wherein the node controller is configured to act as a slave device.

* * * * *

UNITED STATES PATENT AND TRADEMARK OFFICE
CERTIFICATE OF CORRECTION

PATENT NO. : 7,543,100 B2
APPLICATION NO. : 09/883681
DATED : June 2, 2009
INVENTOR(S) : Ashok Singhal et al.

Page 1 of 1

It is certified that error appears in the above-identified patent and that said Letters Patent is hereby corrected as shown below:

Column 16, line 5, claim 11: Cancel "device" and no substitution.

Signed and Sealed this

First Day of September, 2009

David J. Kappos
*Director of the United States Patent and Trademark Office*